(12) United States Patent
Bolinger

(10) Patent No.: US 11,501,326 B1
(45) Date of Patent: Nov. 15, 2022

(54) STORE LOW-STOCK ITEM REPORTING AND PROMOTION SYSTEM AND RELATED METHODS

(71) Applicant: Inmar Clearing, Inc., Winston-Salem, NC (US)

(72) Inventor: Robert W. Bolinger, Pinnacle, NC (US)

(73) Assignee: INMAR CLEARING, INC., Winston-Salem, NC (US)

( * ) Notice: Subject to any disclaimer, the term of this patent is extended or adjusted under 35 U.S.C. 154(b) by 23 days.

(21) Appl. No.: 16/519,760

(22) Filed: Jul. 23, 2019

(51) Int. Cl.
  *G06Q 30/02* (2012.01)
  *G06Q 10/08* (2012.01)

(52) U.S. Cl.
  CPC ..... *G06Q 30/0223* (2013.01); *G06Q 10/0875* (2013.01); *G06Q 30/0217* (2013.01); *G06Q 30/0225* (2013.01)

(58) Field of Classification Search
  CPC ........... G06Q 30/0223; G06Q 10/0875; G06Q 30/0217; G06Q 30/0225
  See application file for complete search history.

(56) References Cited

U.S. PATENT DOCUMENTS

| | | | |
|---|---|---|---|
| 8,833,654 B1 | 9/2014 | Grant | |
| 9,336,547 B2 | 5/2016 | Acker, Jr. et al. | |
| 10,198,711 B2 * | 2/2019 | Jones | G06K 9/00771 |
| 10,410,171 B2 * | 9/2019 | Jones | G06Q 10/087 |
| 10,535,198 B2 * | 1/2020 | Enssle | G06F 3/011 |
| 10,565,546 B2 * | 2/2020 | Pugh | G06Q 10/087 |
| 10,681,095 B1 * | 6/2020 | Wang | H04L 63/105 |
| 2002/0165771 A1 * | 11/2002 | Walker | G06Q 30/06 705/14.35 |
| 2008/0052169 A1 * | 2/2008 | O'Shea | G06Q 30/02 705/14.17 |
| 2012/0158482 A1 * | 6/2012 | Paradise | G06Q 30/0633 705/14.25 |
| 2012/0215601 A1 * | 8/2012 | McGuire | G06Q 30/06 705/14.13 |

(Continued)

OTHER PUBLICATIONS

Grewal et al., Innovations in Retail Pricing and Promotions, Journal of Retailing, vol. 87, Supplement 1, 2011, pp. S43-S52, [ Internet], Retrieved on Jul. 2, 2022 from: URL:<https://doi.org/10.1016/j.jretai.2011.04.008.> (Year: 2011).*

(Continued)

*Primary Examiner* — Abhishek Vyas
*Assistant Examiner* — Monica A Mandel
(74) *Attorney, Agent, or Firm* — Allen, Dyer, Doppelt + Gilchrist, P.A.

(57) ABSTRACT

A store low-stock item reporting and promotion system may include a remote device to be carried by a shopper when shopping within a store and may be configured to acquire an image associated with an item. The system may include a server configured to obtain the image from the remote device, identify the item based upon the image, and determine a low-stock condition for the item based upon the image. Upon determining the low-stock condition, the server may generate a low-stock notification and communicate the low-stock notification to another device, and generate a digital promotion and communicate the digital promotion to the remote device.

27 Claims, 4 Drawing Sheets

(56) References Cited

U.S. PATENT DOCUMENTS

| | | | |
|---|---|---|---|
| 2013/0036043 A1* | 2/2013 | Faith | G06Q 30/0643 705/39 |
| 2014/0032322 A1* | 1/2014 | Schwieger | G06Q 30/02 705/14.55 |
| 2014/0143039 A1* | 5/2014 | Branton | G06Q 30/0223 705/14.24 |
| 2014/0214547 A1* | 7/2014 | Signorelli | G06Q 30/0267 705/14.64 |
| 2014/0278998 A1* | 9/2014 | Systrom | G06Q 30/0277 705/14.57 |
| 2014/0304123 A1* | 10/2014 | Schwartz | G06Q 10/087 705/28 |
| 2014/0365336 A1* | 12/2014 | Hurewitz | G06Q 30/0625 705/26.62 |
| 2015/0134403 A1* | 5/2015 | Schwartz | G06Q 30/0623 705/7.29 |
| 2015/0235157 A1* | 8/2015 | Avegliano | G06Q 10/06315 705/7.25 |
| 2015/0262116 A1* | 9/2015 | Katircioglu | G06K 9/00771 705/28 |
| 2015/0294333 A1* | 10/2015 | Avegliano | A47F 5/0043 705/7.31 |
| 2016/0086029 A1* | 3/2016 | Dubuque | H04W 4/029 382/159 |
| 2016/0171432 A1* | 6/2016 | Pugh | G06Q 30/0635 705/14.23 |
| 2016/0350708 A1* | 12/2016 | Jones | G06Q 10/087 |
| 2016/0371631 A1* | 12/2016 | Jetcheva | G06Q 10/087 |
| 2017/0132650 A1* | 5/2017 | Mcguire | G06Q 30/0239 |
| 2018/0005176 A1 | 1/2018 | Williams et al. | |
| 2018/0197230 A1* | 7/2018 | Tan | G06Q 30/0619 |
| 2019/0080344 A1* | 3/2019 | Faris | G06Q 30/0207 |
| 2019/0149725 A1* | 5/2019 | Adato | H04N 1/32144 348/158 |
| 2019/0197561 A1* | 6/2019 | Adato | G06Q 30/0238 |
| 2020/0134651 A1* | 4/2020 | Perry | G06Q 30/0208 |

OTHER PUBLICATIONS

Bowman et al., U.S. Appl. No. 16/156,631, filed Oct. 10, 2018.

* cited by examiner

STORE LOW-STOCK ITEM REPORTING AND PROMOTION SYSTEM AND RELATED METHODS

TECHNICAL FIELD

The present invention relates to the field of electronics, and more particularly, to store stock item reporting and promotion systems and related methods.

BACKGROUND

A retail store, such as, for example, a grocery store, typically has aisles of products. Products may be stocked on shelves in each aisle or on other product displays (e.g., end-caps). To determine product stock level, the retailer, for example, may manually, based upon a visual inspection, determine when a product within the retail store is subject to a low-stock condition. The retailer may then communicate this information to a stock person at the retailer.

Computers may assist in determining stock levels. For example, a retailer may know how many of any particular product were received and in stock, and may reduce stock numbers based upon known purchases of the product, for example, at a point-of-sale (POS) terminal. However, many retailers do not place all stock on a shelf, but rather may retain some stock in a stockroom. Moreover, damaged, lost, or stolen stock may not be considered in current stock levels.

A fixed video monitoring system may be used within a retail store. The fixed video monitoring system may monitor doors, cashier areas, etc. for security purposes. A fixed video monitoring system may also be used to perform stock analytics.

U.S. Pat. No. 9,336,547 to Acker et al. is directed to integrating local products into global web services. More particularly, Acker et al. discloses an optical code on a shelf. The optical code may be a QR code. In some embodiments, the optical code may have one or more instructions displayed adjacent thereto, such as an instruction that says "scan code to obtain product information," "scan code to add to electronic shopping cart," "scan code to report this item out of stock," "scan code to report this item out of stock or retrieve product information," or some other message.

SUMMARY

A store low-stock item reporting and promotion system may include a remote device to be carried by a shopper when shopping within a store and may be configured to acquire an image associated with an item. The system may include a server configured to obtain the image from the remote device, identify the item based upon the image, and determine a low-stock condition for the item based upon the image. Upon determining the low-stock condition, the server may generate a low-stock notification and communicate the low-stock notification to another device, and generate a digital promotion and communicate the digital promotion to the remote device.

The digital promotion may be for the item. The digital promotion may be for another item at the store, for example. The item may have a brand associated therewith, and the digital promotion may be for a same brand as the item.

The server may be configured to adjust a value of the digital promotion based upon a number of images from the remote device, for example. The image may be of a store shelf space. The image may be of a machine readable identifier associated with the item, for example.

The remote device may include a mobile wireless communications device. The mobile wireless communications device may include a camera, a wireless transceiver, and controller coupled to the camera and wireless transceiver.

A method aspect is directed to a method of reporting a store low-stock item and generating a digital promotion. The method may include using a server to obtain an image from a remote device to be carried by a shopper when shopping within a store and configured to acquire an image associated with an item. The method may also include using the server to identify the item based upon the image and determine a low-stock condition for the item based upon the image. The method may also include using the server to, upon determining the low-stock condition, generate a low-stock notification and communicate the low-stock notification to another device, and generate the digital promotion and communicate the digital promotion to the remote device.

A computer readable medium aspect is directed to a non-transitory computer readable medium for reporting a store low-stock item and generating a digital promotion. The non-transitory computer readable medium may include computer executable instructions that when executed by a processor cause the processor to perform operations. The operations may include obtaining an image from a remote device to be carried by a shopper when shopping within a store and configured to acquire an image associated with an item. The operations may also include identifying the item based upon the image and determining a low-stock condition for the item based upon the image. The operations may also include, upon determining the low-stock condition, generating a low-stock notification and communicating the low-stock notification to another device, and generating the digital promotion and communicating the digital promotion to the remote device.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
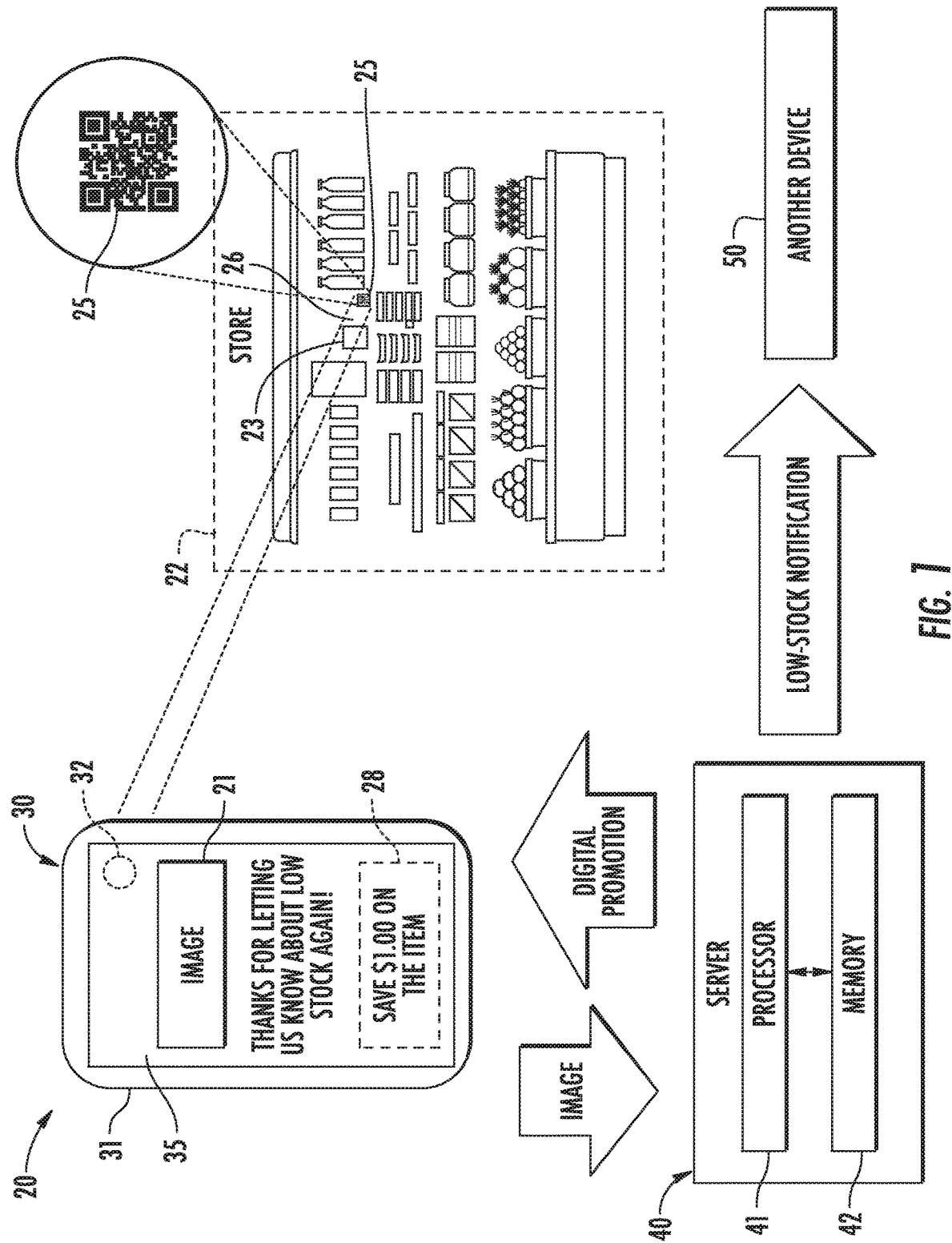
FIG. 1 is a schematic diagram of a store low-stock reporting and promotions system in accordance with an embodiment.
Figure 2:
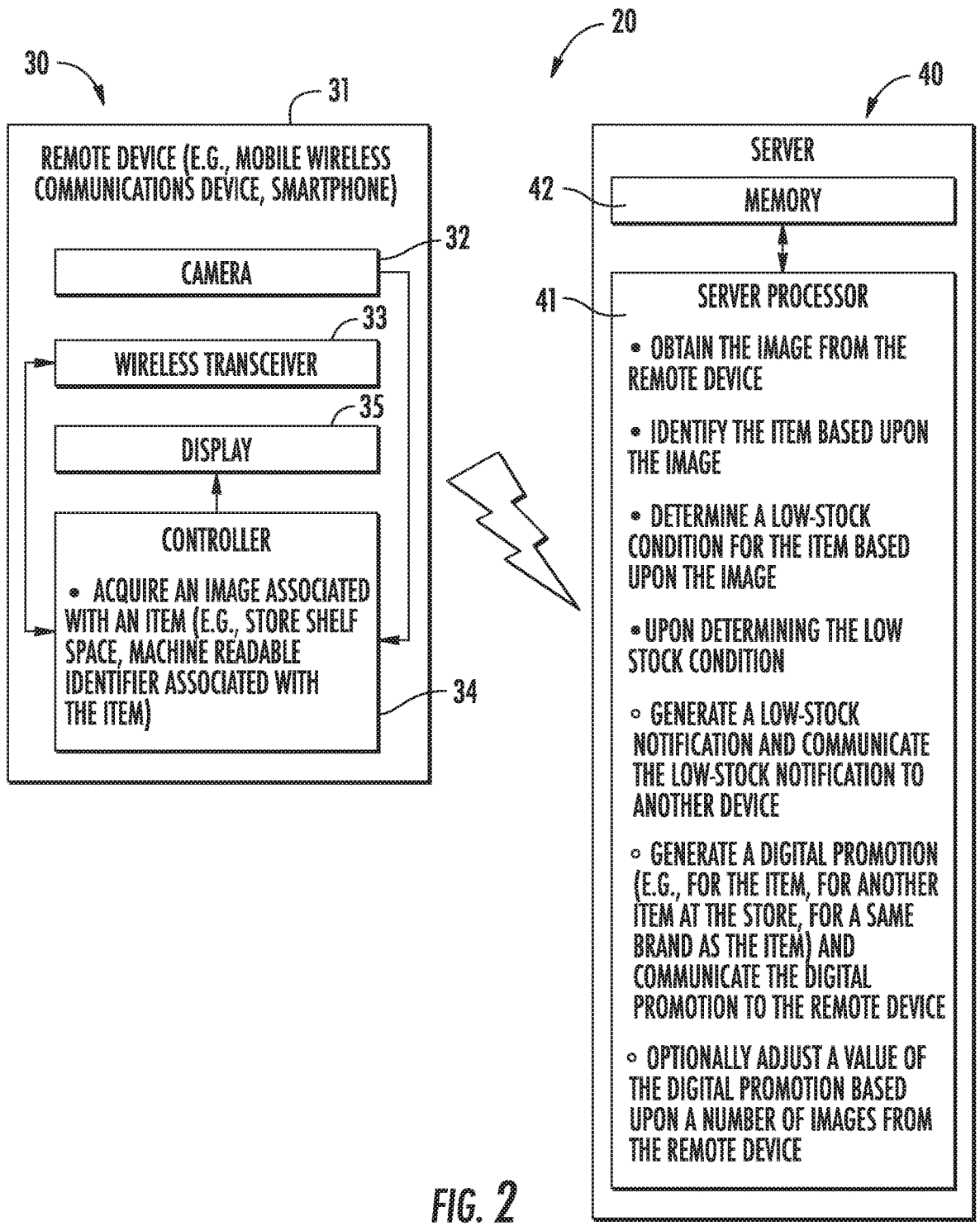
FIG. 2 is a schematic block diagram of the system of FIG. 1.

Referring initially to FIGS. 1-2, a store low-stock item reporting and promotion system 20 include a remote device 30 that is to be carried by a shopper when shopping within a store 22. The remote device 30 may be in the form of a mobile wireless communications device and may include a camera 32 carried by a housing 31, a wireless transceiver 33 carried by the housing, and a controller 34 coupled to the camera and the wireless transceiver. The remote device 30 may also include a display 35 carried by the housing 31 and coupled to the controller 34. The remote device 30 is configured to acquire an image 21 associated with an item 23, for example, by way of the camera 32 when in the form of a mobile wireless communications device.

The system 20 also includes a server 40. The server 40 includes a processor 41 and an associated memory 42. While operations of the server 40 are described herein, it should be appreciated that the operations are performed based upon cooperation of the processor 41 and the memory 42.

Figure 3:
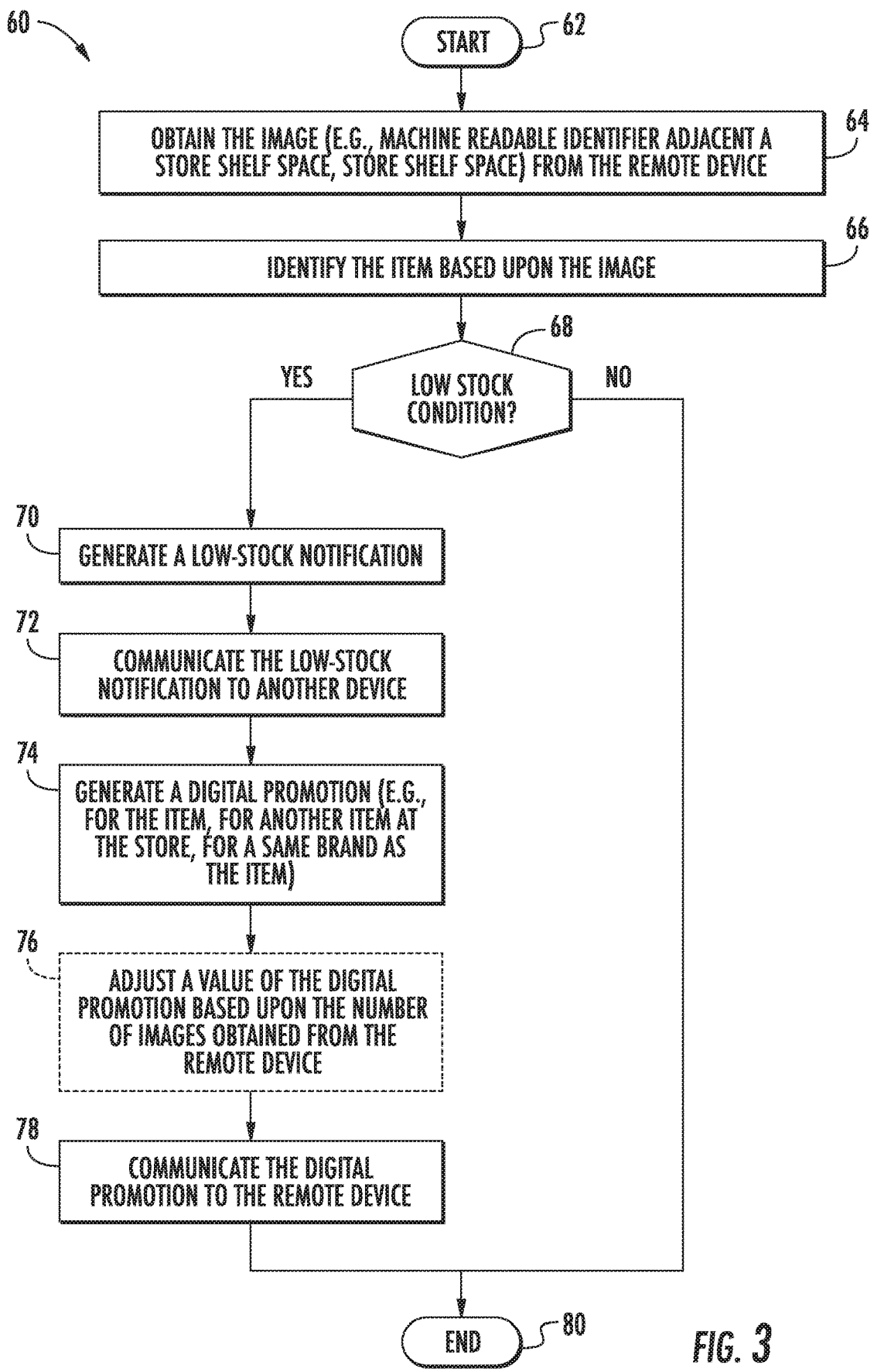
FIG. 3 is a flow chart illustrating operation of the server of the system of FIG. 2.

Referring now additionally to the flowchart 60 in FIG. 3, beginning at Block 62, operations of the server 40 will now be described. At Block 64, the server 40 obtains the image 21 from the remote device 30. The server 40 and the remote device 30 may cooperate, for example, wirelessly to communicate the image 21 (e.g., directly or indirectly via an intermediary device). In other words, the image 21 may be wirelessly sent from the remote device 30 to the server 40, or the server may wirelessly retrieve the image from the remote device.

The server 30, at Block 66, identifies the item 23 based upon the image 21. More particularly, the image 21 may include a machine readable identifier 25 associated with the item 23. The machine readable identifier 25 may be a quick-response (QR) code, for example, and may have text associated therewith to instruct the shopper to scan the code to report a low-stock condition. Those skilled in the art will appreciate that the low-stock condition includes also a no-stock condition. The machine readable identifier 25 may be adjacent store shelf space 26 where the item 23 is located in the store 22. In some embodiments, the machine readable identifier 25 may be a uniform product code (UPC) associated with the item. Signage at the store shelf space 26 may prompt the shopper to scan the UPC code to report a low-stock condition.

At Block 68, the server 40 determines a low-stock condition for the item 23 based upon the image 21. More particularly, the server 40 determines that the image 21 obtained is associated with the item 23 and represents a low-stock condition. As will be appreciated by those skilled the art, there may be additional machine readable codes adjacent the store shelf space 26 that may be scanned to retrieve product information and/or other information other than reporting a low-stock condition. The server 40 may additionally confirm the low-stock condition based upon input to the server or another device, for example, carried by a store employee based upon a visual confirmation of the low-stock condition. In some embodiments, the server 40 may confirm the low-stock condition based upon a quantity on-hand number stored in a database and adjusted based upon purchases of the item 23. If a low-stock condition is not determined at Block 68, operations end at Block 80.

Upon determining the low-stock condition at Block 68, the server 40 generates a low-stock notification (Block 70) and communicates the low-stock notification to another device 50 (Block 72). The low-stock notification may an email, short message service (SMS) notification, notification badge, or other type of notification. The another device 50 may be a computer, server, or other type of device, and may be associated with the store 22. In some embodiments, for example, where the brand itself or other third-party stocks the shelves of the store 22, the server 40 may communicate the low-stock notification to the brand or other third-party.

At Block 74, the server 40 generates a digital promotion 28. The digital promotion 28 may be for the item 23, i.e., the item as reported as having a low-stock condition. The digital promotion 28 may be for another item in the store 22 and/or may be for a different item of the same brand of the low-stock item 23.

At Block 76, the server 40 optionally adjusts a value of the digital promotion 28 based upon the number of images 21 obtained from the remote device 30. More particularly, the server 40 may increase the value of the digital promotion 28 from a baseline value the more the shopper acquires images associated with items 23 (i.e., to be reported low-stock items). If, however, the shopper begins to "game the system," for example by acquiring images of items that do not have a low-stock condition, the server 40 may decrease the value of the digital promotion 28 (e.g., from the baseline value or from an already increased value).

The server 40 communicates the digital promotion 28 to the remote device 30, for example, wirelessly (Block 78). The digital promotion 28 may be displayed on a display 35 of the remote device 30 for redemption at a point-of-sale (POS) terminal during checkout at the store 22. The digital promotion 28 may be stored in a digital wallet for future redemption, as will be appreciated by those skilled in the art. Operations end at Block 80.

Figure 4:
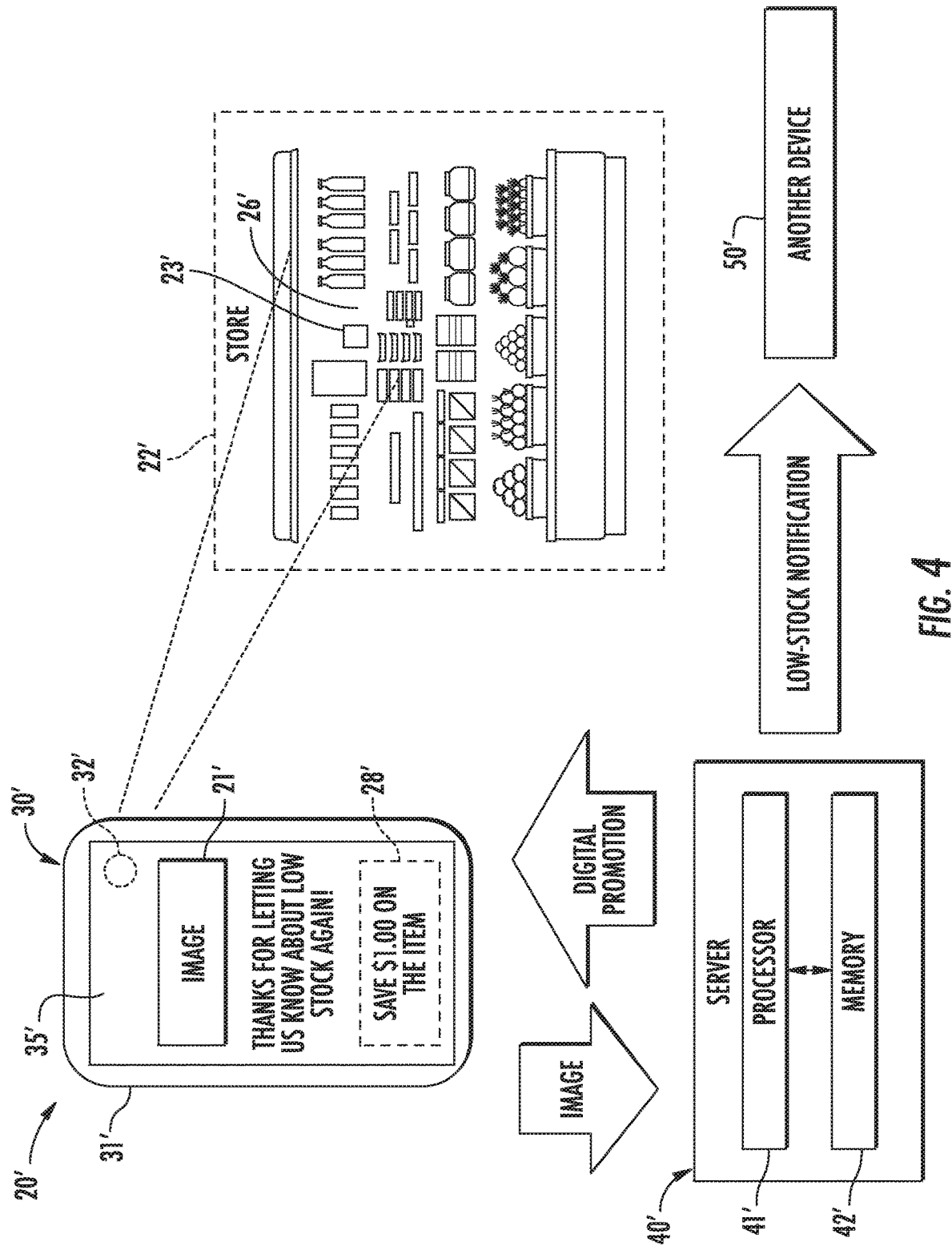
FIG. 4 is a schematic diagram of a store low-stock reporting and promotions system in accordance with another embodiment.

Referring now to FIG. 4, in another embodiment, the image 21' may not be of a machine readable code 25, but instead of the shelf space 26' of the store 22'. More particularly, the image 21' may be of an empty shelf where the item 23' is typically located or a low-stock shelf where a few items remain.

The server 40' determines a low-stock condition by performing image recognition and analysis techniques. For example, the server 40' may identify the item 23' by the location within the store based upon elements from within the image 21'. The server 40' may alternatively or additionally determine the item 23' based upon recognized text and/or images from packaging of the item and/or surrounding items. The server 40' may identify the item 23' to be marked as low-stock and compare that portion of the image 21' to a reference image to determine the low-stock condition. The server 40' may also determine the low-stock condition by determining how much shelf-space is visible in the image 21'.

Upon determining the low-stock condition, the server 40' generates the low-stock notification and communicates the low-stock notification to the another device 50', and generates the digital promotion 28' and communicates the digital promotion to the remote device 30'. These operations of the server 40' are similar to the corresponding operations described with respect to the embodiments above and require no further description herein.

As will be appreciated by those skilled in the art, the store low-stock reporting and promotions system 20 described herein may be particularly advantageous for monitoring stock conditions at a store 22. In many instances, computer tracked inventory is not accurate, or in the case where a particular item is stocked by someone other than the store, tracking inventory may be relatively difficult as there may be no way to track purchases or monitor shopping and traffic patterns with respect to the item. Moreover, a shopper may become disappointed if a particular desired item is not in-stock. The system 20 advantageously rewards a shopper for reporting a low-stock condition and so that based upon the reported low-stock condition, stock levels can be replenished. Thus, other and subsequent shoppers may not be disappointed by the lack of the desired item.

A method aspect is directed to a method of reporting a store low-stock item 23 and generating a digital promotion

28. The method includes using a server 40 to obtain an image 21 from a remote device 30 to be carried by a shopper when shopping within a store 22 and configured to acquire an image associated with an item 23. The method also includes using the server 40 to identify the item 23 based upon the image 21 and determine a low-stock condition for the item based upon the image. The method also includes using the server 40 to, upon determining the low-stock condition, generate a low-stock notification and communicate the low-stock notification to another device 50, and generate the digital promotion 28 and communicate the digital promotion to the remote device 30.

A computer readable medium aspect is directed to non-transitory computer readable medium for reporting a store low-stock item 23 and generating a digital promotion 28. The non-transitory computer readable medium includes computer executable instructions that when executed by a processor 41 cause the processor to perform operations. The operations include obtaining an image 21 from a remote device 30 to be carried by a shopper when shopping within a store 22 and configured to acquire an image associated with an item 23. The operations also include identifying the item 23 based upon the image 21 and determining a low-stock condition for the item based upon the image. The operations also include, upon determining the low-stock condition, generating a low-stock notification and communicating the low-stock notification to another device 50, and generating the digital promotion 28 and communicating the digital promotion to the remote device 30.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A store low-stock item reporting and promotion system comprising:
   a remote device to be carried by a shopper when shopping within a store and configured to, during a shopping trip at the store, acquire a plurality of images of a shelf space at the store and associated with a plurality of items; and
   a server configured to
      obtain the plurality of images from the remote device,
      for a first item of the plurality thereof
         identify the first item based upon a first image of the plurality thereof,
         determine whether a low-stock condition exists for the first item by at least comparing the first image to a first reference image,
         upon determining the low-stock condition exists for the first item,
            generate a low-stock notification and communicate the low-stock notification to another device, and
            generate a digital coupon having a redemption value associated therewith,
      for each subsequent item of the plurality thereof
         identify the subsequent item based upon a subsequent image of the plurality thereof,
         determine whether a low-stock condition exists for the subsequent item by at least comparing the subsequent image to a subsequent reference image, and
         upon determining the low-stock condition exists for the subsequent item, increase the redemption value of the digital coupon, otherwise decrease the redemption value of the digital coupon, and
      communicate the digital coupon having the adjusted redemption value to the remote device for redemption of the digital coupon at a point-of-sale (POS) terminal at the store.

2. The system of claim 1 wherein the digital coupon is for the first item.

3. The system of claim 1 wherein the digital coupon is for another item at the store.

4. The system of claim 1 wherein the first item has a brand associated therewith and wherein the digital coupon is for a same brand as the first item.

5. The system of claim 1 wherein the remote device comprises a mobile wireless communications device comprising a camera, a wireless transceiver, and controller coupled to the camera and wireless transceiver.

6. A store low-stock item reporting and promotion server comprising:
   a processor and an associated memory configured to
      obtain a plurality of images acquired during a shopping trip at a store from a remote device to be carried by a shopper when shopping within the store, the plurality of images being of a shelf space at the store and associated with a plurality of items,
      for a first item of the plurality thereof,
         identify the first item based upon a first image of the plurality thereof,
         determine whether a low-stock condition exists for the first item by at least comparing the first image to a first reference image, and
         upon determining the low-stock condition exists for the first item,
            generate a low-stock notification and communicate the low-stock notification to another device, and
            generate a digital coupon having a redemption value associated therewith,
      for each subsequent item of the plurality thereof
         identify the subsequent item based upon a subsequent image of the plurality thereof,
         determine whether a low-stock condition exists for the subsequent item by at least comparing the subsequent image to a subsequent reference image, and
         upon determining the low-stock condition exists for the subsequent item, increase the redemption value of the digital coupon, otherwise decrease the redemption value of the digital coupon, and
      communicate the digital coupon having the adjusted redemption value to the remote device for redemption of the digital coupon at a point-of-sale (POS) terminal at the store.

7. The server of claim 6 wherein the digital coupon is for the first item.

8. The server of claim 6 wherein the digital coupon is for another item at the store.

9. The server of claim 6 wherein the first item has a brand associated therewith and wherein the digital coupon is for a same brand as the first item.

10. A method of reporting a store low-stock item and generating a digital coupon comprising:

using a server to
obtain a plurality of images acquired during a shopping trip at a store from a remote device to be carried by a shopper when shopping within the store, the plurality of images being of a shelf space at the store and associated with a plurality of items,
for a first item of the plurality thereof
identify the first item based upon a first image of the plurality thereof,
determine whether a low-stock condition exists for the first item by at least comparing the first image to a first reference image, and
upon determining the low-stock condition exists for the first item,
generate a low-stock notification and communicate the low-stock notification to another device, and
generate the digital coupon having a redemption value associated therewith,
for each subsequent item of the plurality thereof
identify the subsequent item based upon a subsequent image of the plurality thereof,
determine whether a low-stock condition exists for the subsequent item by at least comparing the subsequent image to a subsequent reference image, and
upon determining the low-stock condition exists for the subsequent item, increase the redemption value of the digital coupon, otherwise decrease the redemption value of the digital coupon, and
communicate the digital coupon to the remote device for redemption of the digital coupon at a point-of-sale (POS) terminal at the store.

11. The method of claim 10 wherein the digital coupon is for the first item.

12. The method of claim 10 wherein the digital coupon is for another item at the store.

13. A non-transitory computer readable medium for reporting a store low-stock item and generating a digital coupon, the non-transitory computer readable medium comprising computer executable instructions that when executed by a processor cause the processor to perform operations, the operations comprising:

obtaining a plurality of images acquired during a shopping trip at a store from a remote device to be carried by a shopper when shopping within the store, the plurality of images being of shelf space at the store and associated with a plurality of items;
for a first item of the plurality thereof
identifying the first item based upon a first image of the plurality thereof;
determining whether a low-stock condition exists for the first item by at least comparing the first image to a first reference image; and
upon determining the low-stock condition exists for the first item,
generating a low-stock notification and communicating the low-stock notification to another device, and
generating the digital coupon having a redemption value associated therewith,
for each subsequent item of the plurality thereof
identifying the subsequent item based upon a subsequent image of the plurality thereof,
determining whether a low-stock condition for the subsequent item exists by at least comparing the subsequent image to a subsequent reference image, and
upon determining the low-stock condition exists for the subsequent item, increasing the redemption value of the digital coupon, otherwise decreasing the redemption value of the digital coupon, and
communicating the digital coupon to the remote device for redemption of the digital coupon at a point-of-sale (POS) terminal at the store.

14. The non-transitory computer readable medium of claim 13 wherein the digital coupon is for the first item.

15. The non-transitory computer readable medium of claim 13 wherein the digital coupon is for another item at the store.

16. A store low-stock item reporting and promotion system comprising:

a remote device to be carried by a shopper when shopping within a store and configured to, during a shopping trip at the store, acquire a plurality of images of a shelf space at the store and associated with a plurality of items; and
a server configured to
obtain the plurality of images from the remote device,
for a first item of the plurality thereof
identify the first item based upon a first image of the plurality thereof,
determine whether a low-stock condition exists for the first item by at least determining an amount of the shelf space visible in the first image,
upon determining the low-stock condition exists for the first item,
generate a low-stock notification and communicate the low-stock notification to another device, and
generate a digital coupon having a redemption value associated therewith,
for each subsequent item of the plurality thereof
identify the subsequent item based upon a subsequent image of the plurality thereof,
determine whether a low-stock condition exists for the subsequent item by at least determining an amount of the shelf-space visible in the subsequent image, and
upon determining the low-stock condition exists for the subsequent item, increase the redemption value of the digital coupon, otherwise decrease the redemption value of the digital coupon, and
communicate the digital coupon having the adjusted redemption value to the remote device for redemption of the digital coupon at a point-of-sale (POS) terminal at the store.

17. The system of claim 16 wherein the digital coupon is for the first item.

18. The system of claim 16 wherein the digital coupon is for another item at the store.

19. A store low-stock item reporting and promotion server comprising:

a processor and an associated memory configured to
obtain a plurality of images acquired during a shopping trip at a store from a remote device to be carried by a shopper when shopping within the store, the plurality of images being of a shelf space at the store and associated with a plurality of items,
for a first item of the plurality thereof,
identify the first item based upon a first image of the plurality thereof, determine whether a low-stock condition exists for the first item by at least determining an amount of the shelf space visible in the first image, and upon determining the low-stock condition exists for the first item, generate a low-stock notification and communicate the low-stock notification to another device, and generate a digital coupon having a redemption value associated therewith, for each subsequent item of the plurality thereof identify the subsequent item based upon a subsequent image of the plurality thereof, determine whether a low-stock condition exists for the subsequent item by at least determining an amount of the shelf space visible in the subsequent image, and upon determining the low-stock condition exists for the subsequent item, increase the redemption value of the digital coupon, otherwise decrease the redemption value of the digital coupon, and communicate the digital coupon having the adjusted redemption value to the remote device for redemption of the digital coupon at a point-of-sale (POS) terminal at the store.

20. The server of claim 19 wherein the digital coupon is for the first item.

21. The server of claim 19 wherein the digital coupon is for another item at the store.

22. A method of reporting a store low-stock item and generating a digital coupon comprising:

using a server to obtain a plurality of images acquired during a shopping trip at a store from a remote device to be carried by a shopper when shopping within the store, the plurality of images being of a shelf space at the store and associated with a plurality of items, for a first item of the plurality thereof identify the first item based upon a first image of the plurality thereof, determine whether a low-stock condition exists for the first item by at least determining an amount of the shelf-space visible in the first image, and upon determining the low-stock condition exists for the first item, generate a low-stock notification and communicate the low-stock notification to another device, and generate the digital coupon having a redemption value associated therewith, for each subsequent item of the plurality thereof identify the subsequent item based upon a subsequent image of the plurality thereof, determine whether a low-stock condition exists for the subsequent item by at least determining an amount of the shelf-space visible in the subsequent image, and upon determining the low-stock condition exists for the subsequent item, increase the redemption value of the digital coupon, otherwise decrease the redemption value of the digital coupon, and communicate the digital coupon to the remote device for redemption of the digital coupon at a point-of-sale (POS) terminal at the store.

23. The method of claim 22 wherein the digital coupon is for the first item.

24. The method of claim 22 wherein the digital coupon is for another item at the store.

25. A non-transitory computer readable medium for reporting a store low-stock item and generating a digital coupon, the non-transitory computer readable medium comprising computer executable instructions that when executed by a processor cause the processor to perform operations, the operations comprising:

obtaining a plurality of images acquired during a shopping trip at a store from a remote device to be carried by a shopper when shopping within the store, the plurality of images being of shelf space at the store and associated with a plurality of items;

for a first item of the plurality thereof identifying the first item based upon a first image of the plurality thereof;

determining whether a low-stock condition exists for the first item by at least determining an amount of the shelf space visible in the first image; and upon determining the low-stock condition exists for the first item, generating a low-stock notification and communicating the low-stock notification to another device, and generating the digital coupon having a redemption value associated therewith, for each subsequent item of the plurality thereof identifying the subsequent item based upon a subsequent image of the plurality thereof, determining whether a low-stock condition for the subsequent item exists by at least determining an amount of the shelf space visible in the subsequent image, and upon determining the low-stock condition exists for the subsequent item, increasing the redemption value of the digital coupon, otherwise decreasing the redemption value of the digital coupon, and communicating the digital coupon to the remote device for redemption of the digital coupon at a point-of-sale (POS) terminal at the store.

26. The non-transitory computer readable medium of claim 25 wherein the digital coupon is for the first item.

27. The non-transitory computer readable medium of claim 25 wherein the digital coupon is for another item at the store.

* * * * *